United States Patent
Ho

(10) Patent No.: US 12,430,666 B1
(45) Date of Patent: Sep. 30, 2025

(54) TRANSACTIONS USING A MOBILE DEVICE AND A CONTACTLESS CARD

(71) Applicant: Wells Fargo Bank, N.A., San Francisco, CA (US)

(72) Inventor: Peter Ho, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/360,557

(22) Filed: Jun. 28, 2021

Related U.S. Application Data

(63) Continuation of application No. 15/395,067, filed on Dec. 30, 2016, now Pat. No. 11,049,129, which is a continuation of application No. 14/813,716, filed on Jul. 30, 2015, now Pat. No. 10,885,541.

(60) Provisional application No. 62/034,391, filed on Aug. 7, 2014.

(51) Int. Cl.
*G06Q 30/0226* (2023.01)
*G06K 19/06* (2006.01)
*G06Q 20/10* (2012.01)
*G06Q 20/20* (2012.01)
*G06Q 20/32* (2012.01)
(Continued)

(52) U.S. Cl.
CPC ... *G06Q 30/0233* (2013.01); *G06K 19/06028* (2013.01); *G06K 19/06037* (2013.01); *G06Q 20/102* (2013.01); *G06Q 20/202* (2013.01); *G06Q 20/327* (2013.01); *G06Q 20/3278* (2013.01); *G06Q 20/387* (2013.01); *G06Q 20/40* (2013.01); *G06Q 20/409* (2013.01)

(58) Field of Classification Search
None
See application file for complete search history.

(56) References Cited

U.S. PATENT DOCUMENTS

| | | |
|---|---|---|
| 6,615,258 B1 | 9/2003 | Barry et al. |
| 8,352,323 B2 | 1/2013 | Fisher |
| 9,305,295 B2 | 4/2016 | Laracey |

(Continued)

OTHER PUBLICATIONS

Heyer, Amrik and MAS, Ignacio, Fertile Grounds for Mobile Money: Towards a Framework for Analyzing Enabling Environments (Aug. 1, 2010). Enterprise Development and Microfinance, vol. 22, No. 1, Mar. 2011, Available at SSRN: https://ssrn.com/abstract=1593389 (Year: 2011).

(Continued)

*Primary Examiner* — Katherine Kolosowski-Gager
(74) *Attorney, Agent, or Firm* — Foley & Lardner LLP

(57) ABSTRACT

A method includes receiving, by a mobile device of a user, a payment amount for a transaction of the user. The method further includes receiving, by the mobile device, authentication data via a short range communication from a contactless card to the mobile device. The method further includes sending, by the mobile device, the authentication data and the payment amount from the mobile device to an account management system associated with the contactless card. The method further includes receiving, by the mobile device, an authorized form of payment for the payment amount from the account management system based on the user being authenticated using the authentication data. The method further includes providing, by the mobile device, the authorized form of payment to a merchant point of sale device.

16 Claims, 6 Drawing Sheets

(51) Int. Cl.
*G06Q 20/38* (2012.01)
*G06Q 20/40* (2012.01)

(56) References Cited

U.S. PATENT DOCUMENTS

| | | |
|---|---|---|
| 2008/0034221 A1 | 2/2008 | Hammad et al. |
| 2008/0103968 A1 | 5/2008 | Bies et al. |
| 2010/0174598 A1 | 7/2010 | Khan et al. |
| 2012/0005026 A1 | 1/2012 | Khan et al. |
| 2012/0150601 A1 | 6/2012 | Fisher |
| 2012/0209749 A1* | 8/2012 | Hammad ............. G06Q 20/326 705/27.1 |
| 2012/0329388 A1 | 12/2012 | Royston et al. |
| 2013/0110610 A1 | 5/2013 | Boyd |
| 2013/0144785 A1 | 6/2013 | Karpenko et al. |
| 2014/0058857 A1 | 2/2014 | Chuang et al. |
| 2014/0074655 A1 | 3/2014 | Lim et al. |
| 2014/0081729 A1 | 3/2014 | Ocher |
| 2014/0195324 A1 | 7/2014 | Hage |
| 2014/0380382 A1* | 12/2014 | Gupta ................ H04N 21/4826 725/61 |
| 2015/0066651 A1* | 3/2015 | Hu ......................... G06Q 20/20 705/16 |
| 2015/0371470 A1* | 12/2015 | Brown .................. H04L 63/061 340/5.61 |
| 2016/0012465 A1 | 1/2016 | Sharp |
| 2016/0027017 A1 | 1/2016 | Chitragar |

OTHER PUBLICATIONS

Peters et al., Emerging Ecommerce Credit and Debit Card Protocols (Year 2003, 8 pages.
Emerging ecommerce credit and debit card protocols. IEEE.2002. (Year: 2002).
"Secure Mobile Payment Systems". IEEE. 2014 (Year: 2014).
"Online payment procedure involving mobile phone network infrastructure and devices". IEEE. 2011. (Year: 2011).
Chen et al., "NFC Mobile Transactions and Authentication Based on GSM Network," 2010, IEEE, pp. 83-89.

* cited by examiner

TRANSACTIONS USING A MOBILE DEVICE AND A CONTACTLESS CARD

CROSS-REFERENCE TO RELATED PATENT APPLICATIONS

This application is a continuation of U.S. patent application Ser. No. 15/395,067 filed Dec. 30, 2016 and titled "Payment Using Rewards Points," which is a continuation of U.S. patent application Ser. No. 14/813,716 filed Jul. 30, 2015 and titled "Payment Using Rewards Points," which claims the benefit of and priority to U.S. Patent Application No. 62/034,391, filed Aug. 7, 2014, titled "Payment Using Rewards Points," all of which are incorporated herein by reference in their entireties.

BACKGROUND

Financial institutions such as banks typically offer their customers a variety of credit alternatives to meet their needs. One such alternative is for the financial institution to offer the customer a credit card that provides the customer with quick and convenient access to a charge account from multiple locations where the card is accepted. The card issuer typically provides the customer with a plastic card or other device having an account number associated therewith, and establishes a corresponding credit account for the customer. The card or other device may be used by the customer to purchase goods and services while at the same time borrowing against the credit account. The card issuer authorizes payment for the goods or services and then enters a debit to the charge account. The card issuer in turn generates revenue from the convenience of card access to the credit account by charging the customer interest, typically as a percentage of the balance carried on the credit account over a particular period of time.

The card issuer also generates revenue in the form of commissions paid by merchants providing goods and services. Given that many customers prefer the convenience of paying with a credit card, most merchants are willing to agree to accept credit card payments and pay the associated commission to the card issuer in order to increase sales of the goods and services they offer. Typically each merchant will pay the card issuer a commission in the form of a percentage of the amount of each credit card transaction accepted by the merchant.

Accordingly, in order to encourage its customers to use such cards more frequently and thus generate more revenue, the card issuer may offer incentives for each purchase the customer makes using the card. Such incentives may be provided in the form of a loyalty or rewards program associated with a particular card. For example, a card issuer may offer a cashback reward program where a percentage of the amount of each purchase using the associated card is credited back to the customer as a monetary amount. Similarly, the card issuer may credit the customer with a certain number of rewards points based on the amount of each purchase using the associated card. The rewards points earned by the customer may be redeemed for a variety of goods, services, and other items. For example, the card issuer may allow its customers to redeem points for gift cards, airline tickets, online digital media, merchandise from selected merchants, or cash.

While many card issuers offer a wide variety of options for which points may be redeemed, there are currently many limitations on the manner in which rewards points may be redeemed by the customer. For example, many rewards programs that allow customers to redeem rewards points for cash do not allow customers to directly redeem their rewards points in merchant point of sale transactions. Rather, the card issuers require their customers to manually redeem their rewards points in separate points redemption transactions using a system hosted by the card issuer, and may also require customers to redeem rewards points for predetermined cash amounts after minimum thresholds are met. Customers must often maintain their redeemed rewards points in a separate payment device, such as a printed or electronic rewards certificate. Thus, while customers may conveniently access their credit account funds at a merchant point of sale device, customers must engage in a separate advance transaction using a separate system in order to access their rewards account and may also need to carry an additional means of payment representing the cash value of the rewards points they have redeemed.

Furthermore, while some attempts have been made to provide rewards points redemption at merchant locations using point of sale devices provided by the merchant, these systems have the disadvantage of either being limited to rewards points offered by or in partnership with the merchant as opposed to the card issuer, or requiring modification to the merchant's point of sale devices. For example, such systems may require the merchant to implement and maintain software and hardware updates to process additional customer interactions for points redemption transactions. There is an ongoing need for improved methods of payment using rewards points that allow customers to conveniently access both a credit account and a rewards account at the time of a merchant point of sale transaction. There is further need for improved methods of payment using rewards points that do not require any changes to preexisting merchant point of sale devices and systems.

SUMMARY

One embodiment relates to a server system. The server system includes a processing circuit comprising a processor and memory, the memory structured to store instructions that are executable by the processor and cause the processing circuit to receive a payment amount for a transaction of the customer. The instructions also cause the processing circuit to determine an amount of customer financial rewards available in a customer financial rewards account to fund the payment amount. The instructions also cause the processing circuit to generate selectable payment options for the payment amount based on the amount of customer financial rewards. The instructions also cause the processing circuit to transmit the selectable payment options to a customer communication device associated with the customer. The instructions also cause the processing circuit to receive a customer selection of at least one of the selectable payment options from the customer communication device.

Another embodiment relates to a mobile device. The mobile device mobile device includes a display device configured to present information to a user. The mobile device also includes an interface configured to exchange information with the user. The mobile device also includes a processing circuit comprising a processor and memory, the memory structured to store instructions that are executable by the processor and cause the processing circuit to receive a payment amount for a transaction of the customer. The instructions also cause the processing circuit to transmit the payment amount to a server system associated with an issuer of a payment card of the user having a financial rewards account associated therewith. The instructions also cause the processing circuit to receive selectable payment options for the payment amount from the server system, wherein the selectable payment options include at least one of an option to redeem rewards in the financial rewards account to fund the entire payment amount, an option to redeem rewards in the financial rewards account to fund less than the entire payment amount, and an option not to redeem rewards in the financial rewards account. The instructions also cause the processing circuit to present the user with the selectable payment options via the display device. The instructions also cause the processing circuit to receive a customer selection of at least one of the selectable payment options via the interface.

Another embodiment relates to a server system. The server system includes a credit account server configured to manage credit accounts for a plurality of customers of a financial institution. The server system also includes a rewards account server configured to manage financial rewards accounts for a plurality of customers of the financial institution. The server system also includes a central server system comprising a processing circuit, the processing circuit comprising a processor and memory, the memory structured to store instructions that are executable by the processor and cause the processing circuit to receive a payment amount for a transaction of the customer. The instructions also cause the processing circuit to communicate with the rewards account server to determine an amount of customer financial rewards available in a customer financial rewards account to fund the payment amount. The instructions also cause the processing circuit to generate selectable payment options for the payment amount based on the amount of customer financial rewards. The instructions also cause the processing circuit t transmit the selectable payment options to a customer communication device associated with the customer. The instructions also cause the processing circuit to receive a customer selection of at least one of the selectable payment options from the customer communication device.

DETAILED DESCRIPTION

Figure 1:
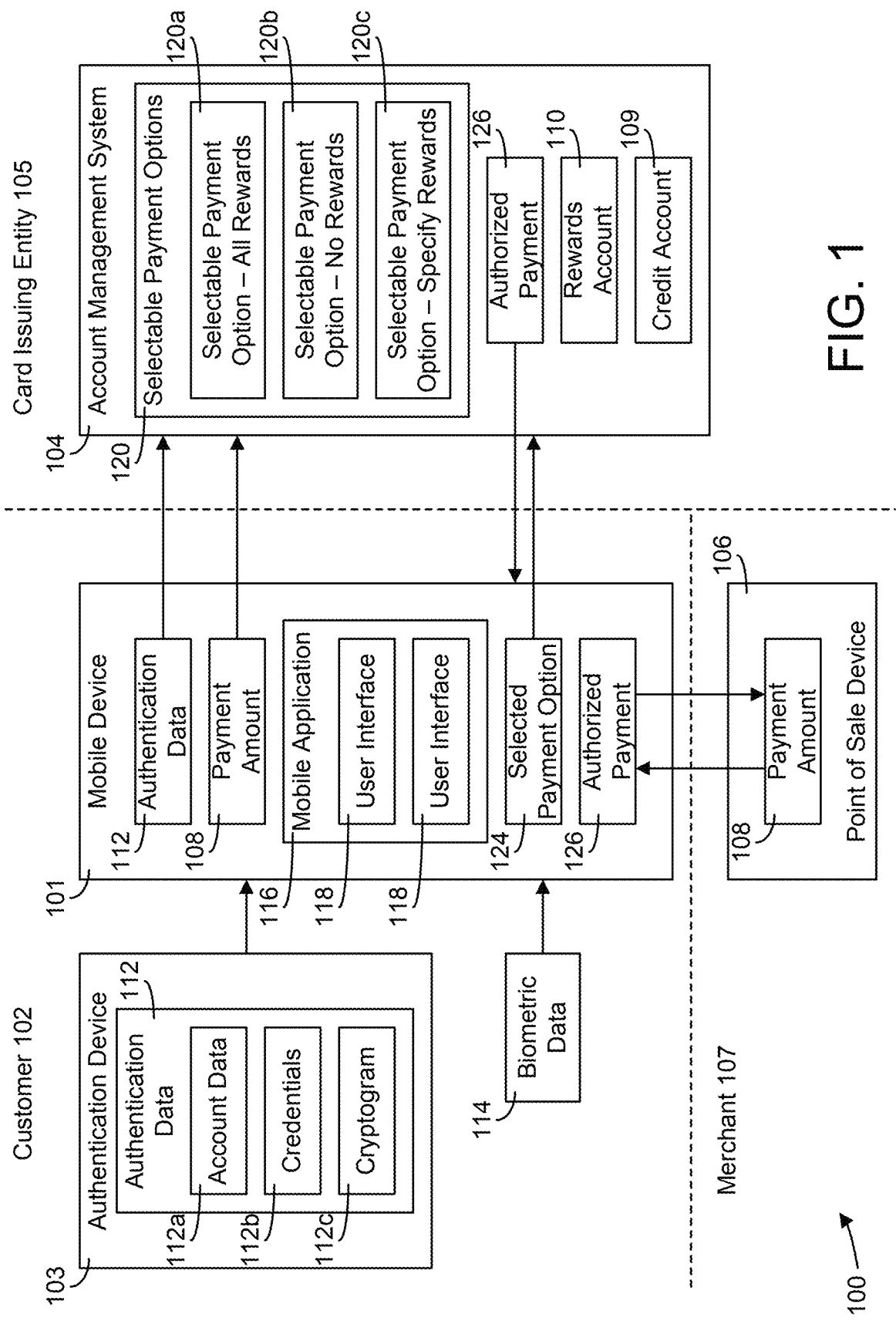
FIG. 1 is a data flow diagram illustrating a process for payment using rewards points according to an exemplary embodiment.

According to various exemplary embodiments, a method of payment using rewards points is provided to customers of card issuing entities, such as banks or other financial institutions. The card issuing entity may provide rewards programs and accounts in conjunction with credit card accounts, wherein rewards points are earned by the customer for each purchase the customer makes using a card issued by the entity. The rewards points earned by the customer may be redeemed for a variety of goods and services or cash. A customer seeking to purchase goods or services in a merchant point of sale transaction by redeeming rewards points may provide authentication data to a mobile device, such as a cellular phone, smart phone, personal digital assistant (PDA), tablet device, laptop computer or other device. The mobile device may be proximity enabled by, for example, a near field communications (NFC) or host card emulation (HCE) equipped device.

The authentication data may include, for example, account information such as the customer's name, credit account or credit card number, card expiration data, and rewards account number. The authentication data may further contain, for example, username and password credentials for online access to the customer's credit account and/or rewards account. According to an exemplary embodiment, the customer's authentication data may be received at the mobile device via a contactless smart card that cryptographically generates a code which can be verified by the card issuer's systems for purposes of authenticating the customer. According to another exemplary embodiment, biometric data may be provided to the mobile device for purposes of authenticating the customer, and account data may be stored on the mobile device.

In some embodiments, the customer may execute a mobile application on the mobile device in order to facilitate receiving the authentication data. For example, the customer may tap the contactless smart card to the mobile device in order to execute a mobile application that retrieves the authentication data from the contactless smart card. Alternatively, the mobile application may be executed upon receiving a signal from a merchant's point of sale device, or upon the customer tapping a graphical element displayed on the mobile device.

The mobile device may further receive a payment amount for the merchant point of sale transaction. In embodiments where the customer has executed a mobile application on the mobile device in order to facilitate receiving the authentication data, the customer may input the payment amount via a graphical user interface of the mobile application. For example, the merchant's point of sale device may display the payment amount, or the merchant may verbally convey the payment amount, and the customer may enter this amount in a field provided in the graphical user interface. In other embodiments, the payment amount may be electronically transmitted to the mobile device from the merchant's point of sale device.

The mobile device may send the customer's authentication data and the payment amount to an account management system associated with the card issuing entity. Upon receiving the customer's authentication data and the payment amount, the account management system may authenticate the customer. The account management system may also access the customer's credit account and rewards account. The account management system may determine the amount of rewards points currently available for the customer to redeem and may further determine a number of payment options selectable by the customer. The selectable payment options may include an option to redeem a portion of the rewards points currently available for the customer to fund a portion of the payment amount. For example, the selectable payment options may include an option to redeem a portion of the rewards points to fund the entire payment amount, an option to redeem a portion of the rewards points to fund less than the entire payment amount, and an option not to redeem any of the portion of rewards points.

The selectable payment options may be sent from the account management system to the mobile device. Upon receiving the selectable payment options from the account management system, the mobile device may present them to the customer. In some embodiments where the customer has executed a mobile application on the mobile device in order to facilitate receiving the authentication data, the mobile device may display the selectable payment options via a graphical user interface of the mobile application. The customer may select one of the payment options from the displayed payment options. For example, in some embodiments where the customer has executed a mobile application on the mobile device to display the selectable payment options, the mobile application may be further configured to receive the customer's selection via a graphical user interface.

The customer's selected payment option may be sent to the account management system. Upon receiving the customer's selected payment option, the account management system may send an authorized form of payment to the mobile device. The form of payment may be a single form of payment configured for presentation to the merchant's point of sale device, regardless of whether the customer is funding all, a portion, or none of the payment amount by redeeming rewards points. In some embodiments, the authorized form of payment is displayable by the mobile device, such as a barcode that may be scanned by the merchant's point of sale device. In some embodiments, the form of payment may be configured for electronic transmission from the mobile device to the merchant's point of sale device.

As will be appreciated, the methods of payment using rewards points described in the various exemplary embodiments eliminate one of the major limitations on the manner in which points may currently be redeemed by allowing customers to directly redeem their rewards points in merchant transactions. Customers may redeem rewards points for all, some, or none of the payment amount in the same transaction as opposed to redeeming rewards points for predetermined fixed cash amounts using a separate payment device representing the cash value of the redeemed points. That is, customers may conveniently access both their credit account funds and their rewards account at a merchant location.

Furthermore, the methods of payment using rewards points described in the various exemplary embodiments are not limited to rewards points offered by or in partnership with the merchant as opposed to the card issuer, and do not require the merchant to implement and maintain software and hardware updates to point of sale devices in order to process additional customer interactions for points redemption transactions. Rather, the form of payment provided herein may leverage a customer's mobile device in combination with existing merchant point of sale devices, such as barcode scanning devices and NFC devices, without modification to these devices.

Referring now to FIG. 1, a data flow diagram illustrating a process 100 for payment using rewards points according to an exemplary embodiment is shown. FIG. 1 generally illustrates an embodiment of process 100 wherein data is variously exchanged between a mobile device 101, such as a cellular phone, smart phone, personal digital assistant (PDA) tablet device, laptop computer or other device owned by customer 102, an authentication device 103, an account management system 104 operated by a card issuing entity 105, and a point of sale device 106 operated by a merchant 107. Although card issuing entity 105 may typically be described herein as a financial institution, such as a bank, other types of card issuing entities are contemplated as well. Similarly, while merchant 107 may typically be described herein in the context of a physical location of a department store, all types of merchants are contemplated as well. Furthermore, as contemplated herein, the card issuing entity and the merchant are not affiliated, such that the term "rewards points" as used herein refers to rewards points issued and maintained by the card issuing entity and not by the merchant.

Process 100 typically begins with customer 102 entering a store location of merchant 107 and selecting one or more goods or services for purchase. For example, customer 102 may enter a department store operated by merchant 107 and select one or more items of merchandise for purchase. Customer 102 may proceed to a checkout station having a point of sale device 106 operated by merchant 107. Merchant 107 may utilize point of sale device 106 to determine a final payment amount 108 for the one or more items of merchandise. Customer 102 may wish to use a credit card issued by card issuing entity 105 in the form of authentication device 103 in order to fund the payment amount from a credit account 109 as opposed to performing a cash transaction. Customer 102 may further wish to utilize rewards points in a rewards account 110 maintained by card issuing entity 105 to fund at least a portion of payment amount 108.

In order to initiate payment of the payment amount, in some embodiments customer 102 may provide authentication data 112 to a mobile device 101 so that account management system 104 will be able to verify that it is in fact customer 102 initiating the transaction. Authentication data 112 may include, for example, account data 112*a* such as customer 102's name, credit account or credit card number, card expiration date, and rewards account number. Authentication data 110 may further contain, for example, username and password credentials 112*b* for online access to credit account 109 and/or rewards account 110.

In some embodiments, customer 102 may provide authentication data 112 to mobile device 101 via authentication device 103. For example, authentication device 103 may be a contactless EUROPAY, MASTERCARD and VISA (EMV) smart card issued by entity 105 and mobile device 101 may be an NFC equipped device capable of receiving data from authentication device 103. Authentication device 103 may store account data 112*a* and/or credentials 112*b*, and may also cryptographically generate a code 112*c* which may be verified by card issuing entity 105 for purposes of authenticating customer 102. By presenting EMV authentication device 103 within range of NFC enabled mobile device 101 (e.g., tapping authentication device 103 against mobile device 101), authentication data 112 may be transferred to mobile device 101. In some embodiments, authentication device 103 may not be used to provide authentication data 112. In such embodiments, mobile device 101 may store account data 112*a* and/or credentials 112*b* in a memory location, and biometric data 114, such as a fingerprint, may be provided to mobile device 101 for purposes of authentication.

In some embodiments, customer 102 may execute a mobile application 116 on mobile device 101 in order to facilitate receiving authentication data 112. For example, in EMV and/or NFC device embodiments, customer 102 may tap authentication device 103 to mobile device 101 in order to execute mobile application 116. Upon detecting authentication device 103, mobile device 101 may automatically launch mobile application 116, which in turn facilitates automatic retrieval of authentication data 112 from the authentication device 103.

In some embodiments, mobile application 116 may be executed upon customer 102 tapping a graphical element corresponding to mobile application 116 and displayed on mobile device 101. For example, customer 102 may tap an icon displayed on a screen of mobile device 101 to launch mobile application 116, which in turn may prompt customer 102 to tap authentication device 103 to mobile device 101 to begin automatic retrieval of authentication data 112 from the authentication device 103.

In some embodiments, mobile application 116 may be executed upon receiving a signal from another NFC device, such as point of sale device 106. For example, where mobile device 101 as well as point of sale device 106 are radio frequency (e.g., RFID) or NFC-enabled, customer 102 may bring mobile device 101 within a radio frequency range of point of sale device 106 in order to execute mobile application 116. In one such an arrangement, upon detecting the radio frequency field of point of sale device 106, mobile device 101 automatically launches the mobile application 116. Mobile application 116 may then be used to retrieve authentication data 112 from the authentication device.

Figure 2:
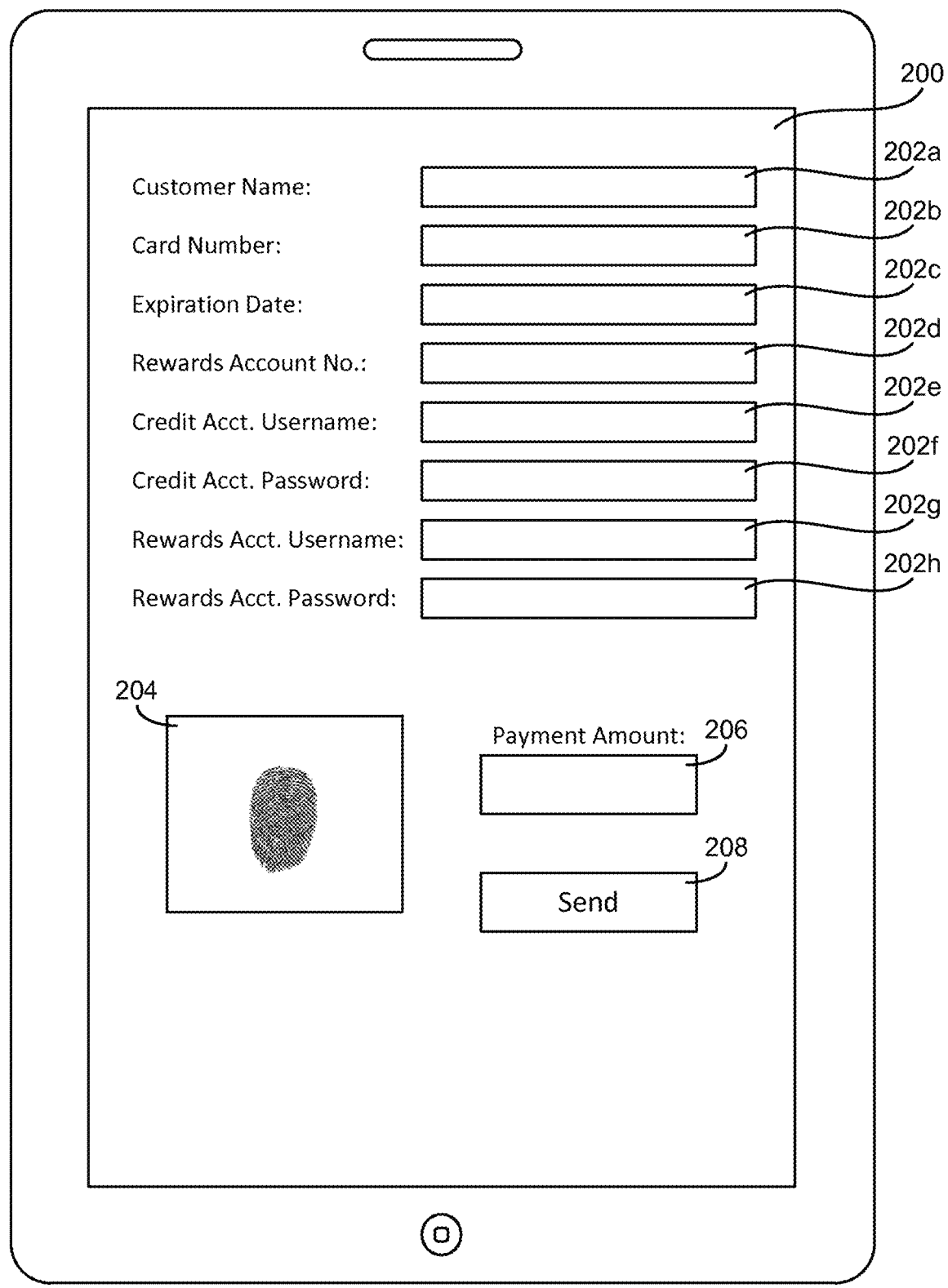
FIG. 2 is a depiction of a user interface that may be used to facilitate receiving and sending authentication and payment data according to an exemplary embodiment.

In some embodiments, mobile application 116 may be configured to, upon being executed, display a graphical user interface 118 on mobile device 101 to facilitate receiving authentication data 112. For example, referring now to FIG. 2, a user interface 200 that may be used to facilitate receiving authentication data according to an exemplary embodiment is shown. User interface 200 may be formatted as, for example, a PDF or HTML document capable of being displayed on a mobile device and further configured for data entry using a suitable user interface device. User interface 200 may include one or more authentication data entry fields 202 configured to receive data either automatically via pre-population or via a user interface device, such as a keypad (e.g., a physical or virtual keypad) or touch screen display. For example, in the illustrated embodiment, a data entry field 202a corresponds to a name for the customer. A data entry field 202b corresponds to credit account or credit card number for the customer. A data entry field 202c corresponds to a card expiration date. A data entry field 202d corresponds to a rewards account number. Data entry fields 202 may further include, for example, fields 202e, 202f, 202g, and 202h for username and password credentials for online access to corresponding credit accounts and rewards accounts.

Referring again to FIG. 1, in some embodiments, graphical user interface 118 may be automatically populated in full or in part. For example, in embodiments where customer 102 may tap authentication device 103 to mobile device 101 in order to execute mobile application 116, authentication data 112 stored on authentication device 103 may be used to populate graphical user interface 118. Similarly, in embodiments where customer 102 may tap an icon displayed on a screen of mobile device 101 to launch mobile application 116, customer 102 may be prompted to tap authentication device 103 to mobile device 101 in order to automatically populate graphical user interface 118. In other embodiments, graphical user interface 118 may be manually populated in full or in part.

In some embodiments, graphical user interface 118 may be further configured to receive biometric data 114 from customer 102, such as in embodiments where an EMV or other authentication device 103 is not used to provide authentication data 112, or where a second level of authentication is desired. For example, referring again to FIG. 2, in the illustrated embodiment, a data entry field 204 corresponds to a fingerprint pad where the customer's fingerprint may be placed in order to be captured.

Referring again to FIG. 1, mobile device 101 may further receive payment amount 108. Payment amount 108 may be, for example, electronically transmitted to mobile device 101 from point of sale device 106 (e.g., in embodiments where point of sale device 106 is an NFC device). In some embodiments, mobile application 116 is used to facilitate receiving the payment amount. For example, a signal received from point of sale device 106 conveying payment amount 108 may cause mobile device 101 to execute mobile application 116, or customer 102 may have already executed mobile application 116 on mobile device 101 in order to facilitate receiving authentication data 110.

In some embodiments, customer 102 may input payment amount 108 via a graphical user interface of mobile application 116. For example, point of sale device 106 may display payment amount 108, or merchant 107 may verbally convey payment amount 108, and customer 102 may manually enter this amount in a field provided in the graphical user interface. For example, referring again to FIG. 2, in the illustrated embodiment, a data entry field 206 corresponds to a payment amount for a point of sale transaction. In other embodiments, the payment amount may be automatically populated in field 206.

Referring again to FIG. 1, mobile device 101 may send authentication data 112 and payment amount 108 to an account management system 104 associated with card issuing entity 105. For example, in some embodiments, authentication data 112 and payment amount 108 are automatically received by mobile device 101 and electronically transmitted to account management system 104 (e.g., upon customer 102 tapping an EMV authentication device 103 to an NFC mobile device 101, or upon receiving a signal from an NFC point of sale device 106). In some embodiments, graphical user interface 118 provided by mobile application 116 is used to facilitate receiving and sending authentication data 112 and payment amount 108. For example, referring again to FIG. 2, in the illustrated embodiment, a graphical element in the format of a button 208 that may be tapped by the customer is configured to allow the customer to send data entered via user interface 200 to an account management system operated by a card issuing entity.

Referring again to FIG. 1, upon receiving authentication data 112 and payment amount 108, account management system 104 may authenticate customer 102 (e.g., using authentication data 112 and perhaps biometric data 114). Upon authenticating customer 102, account management system 104 may also access credit account 109 and/or rewards account 110. Account management system 104 may determine the amount of available credit in credit account 109 and the number of rewards points currently available for customer 102 to redeem in rewards account 110. Based on the amount of available credit in credit account 109 and the number of rewards points currently available for customer 102 to redeem in rewards account 110, account management system 104 may further determine a number of payment options 120 selectable by the customer. Selectable payment options 120 may include an option to redeem a portion of the rewards points currently available for customer 102 to fund a portion of payment amount 108. The portion of rewards points may be any amount, from zero up to the maximum available amount of rewards points in rewards account 110.

Similarly, the portion of payment amount 108 may be any amount, from zero up to the entire amount of payment amount 108.

For example, payment amount 108 received by account management system 104 may be equal to $100.00. Account management system 104 may determine that customer 102 has sufficient available credit in credit account 109 to fund the entire amount of payment amount 108. Account management system 104 may further determine that customer 102 also has a sufficient amount of redeemable rewards points in rewards account 110 to fund the entire amount of payment amount 108. In this case, selectable payment options 120 may include an option 120*a* for customer 102 to fund the entire amount of payment amount 108 by redeeming $100.00 worth of rewards points. Selectable payment options 120 may also include an option 120*b* for customer 102 to fund the entire amount of payment amount 108 without redeeming any rewards points. Selectable payment options 120 may also include an option 120*c* for customer 102 to specify a particular amount of payment amount 108, from zero up to the entire amount of payment amount 108, for which a portion of the rewards points currently available for customer 102 should be redeemed.

In another example, payment amount 108 received by account management system 104 may again be equal to $100.00. Account management system 104 may determine that customer 102 has sufficient available credit in credit account 109 to fund the entire amount of payment amount 108. Account management system 104 may further determine that customer 102 does not have a sufficient amount of redeemable rewards points in rewards account 110 to fund the entire $100.00 amount of payment amount 108, but does, however, have a sufficient amount of redeemable rewards points to fund up to a $50.00 portion of payment amount 108. In this case, selectable payment options 120 would not include option 120*a* for customer 102 to fund the entire amount of payment amount 108 by redeeming $100.00 worth of rewards points. Selectable payment options 120 may, however, include option 120*b* for customer 102 to fund the entire amount of payment amount 108 without redeeming any rewards points. Selectable payment options 120 may also include an option 120*c* for customer 102 to specify a particular amount of payment amount 108, this time from zero up to the amount of payment amount 108 for which sufficient redeemable rewards points are currently available for customer 102, which in this example is $50.00.

Similarly, in yet another example, payment amount 108 received by account management system 104 may again be equal to $100.00. Account management system 104 may determine that customer 102 has sufficient available credit in credit account 109 to fund the entire amount of payment amount 108. Account management system 104 may further determine that customer 102 does not have a sufficient amount of redeemable rewards points to fund any portion of payment amount 108. In this case, selectable payment options 120 may only include option 120*b* for customer 102 to fund the entire amount of payment amount 108 from credit account 109 and without redeeming any rewards points from rewards account 110. Selectable payment options 120 may also include an indication that customer 102 does not have a sufficient amount of redeemable rewards points to fund any portion of payment amount 108.

Selectable payment options 120 may be sent from account management system 104 to mobile device 101. Upon receiving selectable payment options 120 from account management system 104, mobile device 101 may present them to customer 102. In some embodiments, where customer 102 has executed mobile application 116 on mobile device 101 (e.g., in order to facilitate receiving and sending authentication data 112 and payment amount 108), mobile device 101 may display selectable payment options 120 via a graphical user interface 122 generated by mobile application 116. Customer 102 may then select one of payment options 120 as a selected payment option 124. For example, in some embodiments where customer 102 has executed mobile application 116 on mobile device 101 to display selectable payment options 120, graphical user interface 122 may be further configured to receive customer 102's selection of selected payment option 124 (e.g., via customer tapping or otherwise selecting a graphical element corresponding to selected payment option 124).

Figure 3:
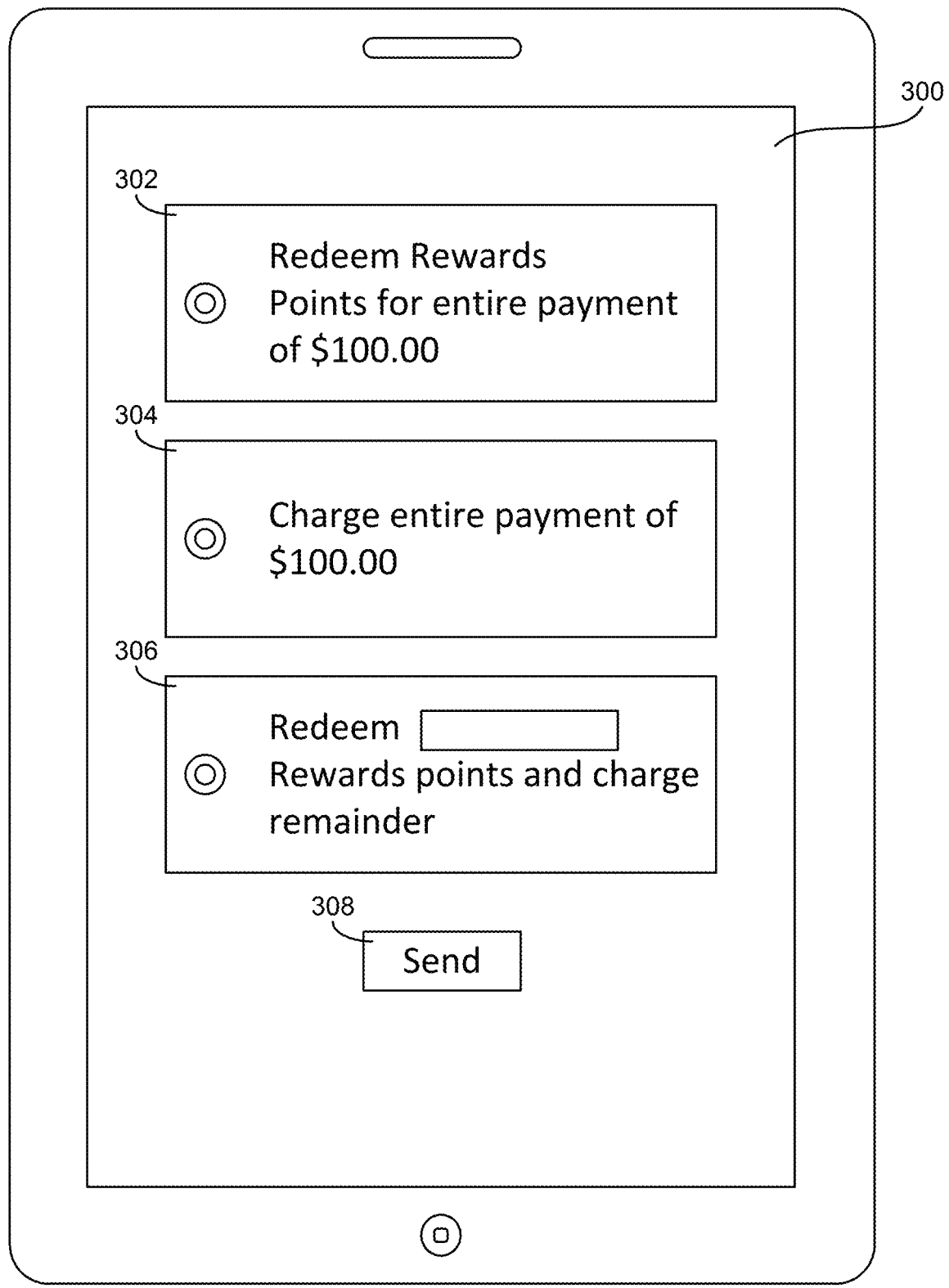
FIG. 3 is a depiction of a user interface that may be used to facilitate receiving and sending selectable payment options according to an exemplary embodiment.

Referring now to FIG. 3, a user interface 300 that may be used to facilitate receiving and sending selectable payment options according to an exemplary embodiment is shown. User interface 300 may be formatted as, for example, a PDF or HTML document capable of being displayed on a mobile device and further configured for data entry using a suitable user interface device. User interface 300 may include one or more graphical elements configured to receive input either automatically or via a user interface device, such as a keypad (e.g., a physical or virtual keypad) or touch screen display.

As shown in FIG. 3, user interface 300 may include one or more selectable objects (e.g., radio buttons or check boxes) corresponding to a number of selectable payment options that may be selected by a customer. For example, in the illustrated embodiment, user interface 300 includes selectable objects 302, 304, and 306 that may be selected by the customer. Selectable object 302 corresponds to a selectable payment option for funding an entire $100.00 payment amount by redeeming $100.00 worth of rewards points. Selectable object 304 corresponds to a selectable payment option for funding the entire $100.00 payment amount from a charge account without redeeming any rewards points. Selectable object 306 corresponds to an option to specify a particular portion of the $100 payment amount, from zero up to the entire payment amount, for which a portion of the rewards points currently available should be redeemed, with the remainder of the payment account funded from a charge account. The customer may select one of the selectable payment options by, for example, tapping the corresponding selectable object (e.g., via a touch screen display).

As will be appreciated, selectable objects for other payment options are contemplated as well. For example, selectable object 306 could correspond to an option to specify a particular portion of the $100 payment amount, from zero up to a maximum amount of the payment amount for which an equivalent value of rewards points are currently available (e.g., in situations where the customer does not have a sufficient number of redeemable rewards points available to fund the entire payment amount). Similarly, in some embodiments user interface 300 may provide an indication that the customer does not have a sufficient amount of redeemable rewards points to fund any portion of the payment amount.

Referring again to FIG. 1, mobile device 101 may send customer 102's selected payment option 124 to account management system 104. In some embodiments, graphical user interface 122 provided by mobile application 116 is used to facilitate sending customer 102's selected payment option 124 to account management system 104. For example, referring again to FIG. 3, in the illustrated embodiment, a graphical element in the format of a button 308 that may be tapped by the customer is configured to allow the customer to send a selected payment option to an account management system operated by a card issuing entity.

Referring again to FIG. 1, upon receiving customer 102's selected payment option 124, account management system 104 may deduct or place a hold on any corresponding amounts from credit account 109 and rewards account 110. For example, if account management system 104 receives a selected payment option 124 indicating that a $50.00 portion of a payment amount of $100.00 should be funded by redeeming $50.00 worth of rewards points, then account management system 104 may proceed to hold or deduct $50.00 from the current available credit limit of credit account 109. Account management system 104 may further proceed to deduct the equivalent of $50.00 worth of rewards points from rewards account 110.

Figure 4:
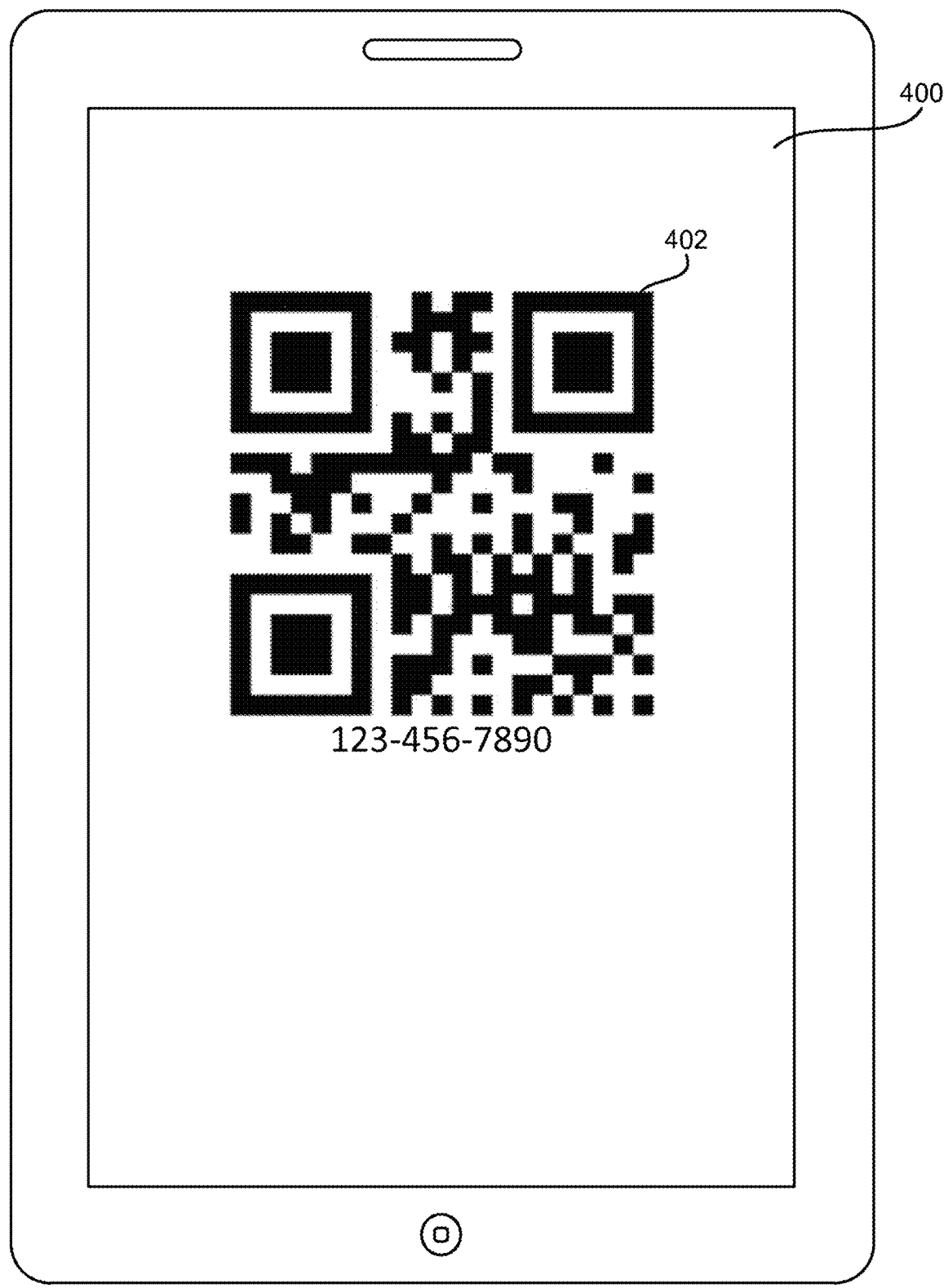
FIG. 4 is a depiction of a single displayable authorized form of payment according to an exemplary embodiment.

Account management system 104 may then send an authorized form of payment 126 to mobile device 101. Authorized form of payment 126 may be a single form of payment configured for presentation to point of sale device 106, regardless of whether customer 102 is funding all, a portion, or none of payment amount 108 by redeeming rewards points. In some embodiments, authorized form of payment 126 is displayable by mobile device 101. For example, referring now to FIG. 4, a single displayable authorized payment form 400 according to an exemplary embodiment is shown. Payment form 400 includes a quick response (QR) code 402 that may be scanned by a merchant's point of sale device to acquire the details of the authorized payment. In other arrangements, a bar code may be used instead of the QR code 402.

Referring again to FIG. 1, in some embodiments, authorized form of payment 126 may be configured for electronic transmission from mobile device 101 to point of sale device 106. For example, in embodiments where both mobile device 101 and point of sale device 106 are NFC enabled devices, authorized form of payment 126 may be appropriately formatted according to industry standards for transmission from mobile device 101 to point of sale device 106. In some embodiments, upon receiving selected payment option 124, account management system 104 may deduct or place a hold on any corresponding amounts from credit account 109 and rewards account 110, and customer 102 may present a credit card (e.g., authentication device 103) to merchant 107 for processing at point of sale device 106, rather than sending authorized form of payment 126 to mobile device 101. Account management system may then later reconcile the credit card transaction in accordance with selected payment option 124.

Figure 5:
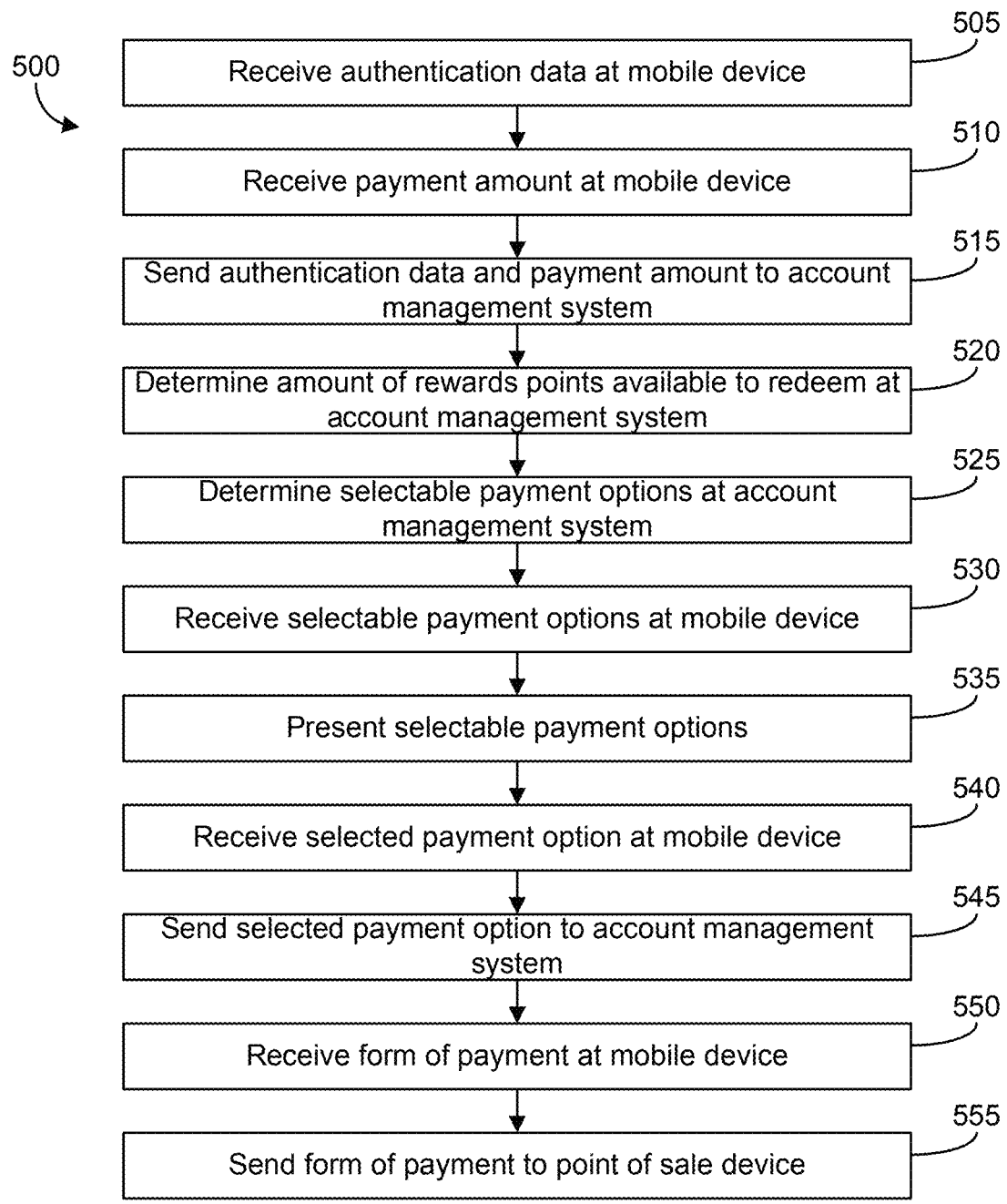
FIG. 5 is a flowchart of a process for payment using rewards points according to an exemplary embodiment.

Referring now to FIG. 5, a flowchart of a process 500 for payment using rewards points according to an exemplary embodiment is shown. At a step 505, authentication data from a customer seeking to purchase goods or services in a merchant point of sale transaction by redeeming rewards points may be received at a mobile device. The mobile device may be, for example, an NFC enabled cellular phone, smart phone, personal digital assistant (PDA), tablet device, laptop computer or other device. The authentication data may include, for example, account information such as the customer's name, credit account or credit card number, card expiration data, and rewards account number. According to an exemplary embodiment, the customer's authentication data may be received at the mobile device via a contactless smart-card that cryptographically generates a code which can be verified by the card issuer's systems for purposes of authenticating the customer. According to another exemplary embodiment, biometric data may be provided to the mobile device for purposes of authenticating the customer. In some embodiments, the customer may execute a mobile application on the mobile device in order to facilitate receiving the authentication data.

At a step 510, the mobile device may further receive a payment amount for the merchant point of sale transaction. In some embodiments, the customer may input the payment amount via a mobile application. In some embodiments, the payment amount may be electronically transmitted to the mobile device from the merchant's point of sale device.

At a step 515, the mobile device may send the customer's authentication data and the payment amount to an account management system associated with the card issuing entity so that, upon receiving the customer's authentication data and the payment amount, the account management system may authenticate the customer and access the customer's credit account and rewards account. At a step 520, the account management system may determine the amount of rewards points currently available for the customer to redeem.

At a step 525, the account management system may determine a number of payment options selectable by the customer. The selectable payment options may include an option to redeem a portion of the rewards points currently available for the customer to fund a portion of the payment amount. For example, the selectable payment options may include an option to redeem a portion of the rewards points to fund the entire payment amount, an option to redeem a portion of the rewards points to fund less than the entire payment amount, and an option not to redeem any of the portion of rewards points.

At a step 530, the selectable payment options may be sent from the account management system to the mobile device. At a step 535, the mobile device may present the selectable payment options to the customer. In some embodiments, the mobile device may display the selectable payment options via a graphical user interface of a mobile application. At a step 540, the mobile device may receive a selected payment option selected by the customer from the displayed payment options. In some embodiments, a mobile application may be configured to receive the customer's selected payment option via a graphical user interface.

At a step 545, the customer's selected payment option may be sent to the account management system. At a step 550, the account management system may send an authorized form of payment to the mobile device. The form of payment may be, for example, a single form of payment configured for presentation to the merchant's point of sale device, regardless of whether the customer is funding all, a portion, or none of the payment amount by redeeming rewards points. At a step 555, the mobile device may send the form of payment to the point of sale device. In some embodiments, the authorized form of payment may be displayable by the mobile device, such as a barcode that may be scanned by the merchant's point of sale device. In some embodiments, the form of payment may be configured for electronic transmission from the mobile device to the merchant's point of sale device.

Figure 6:
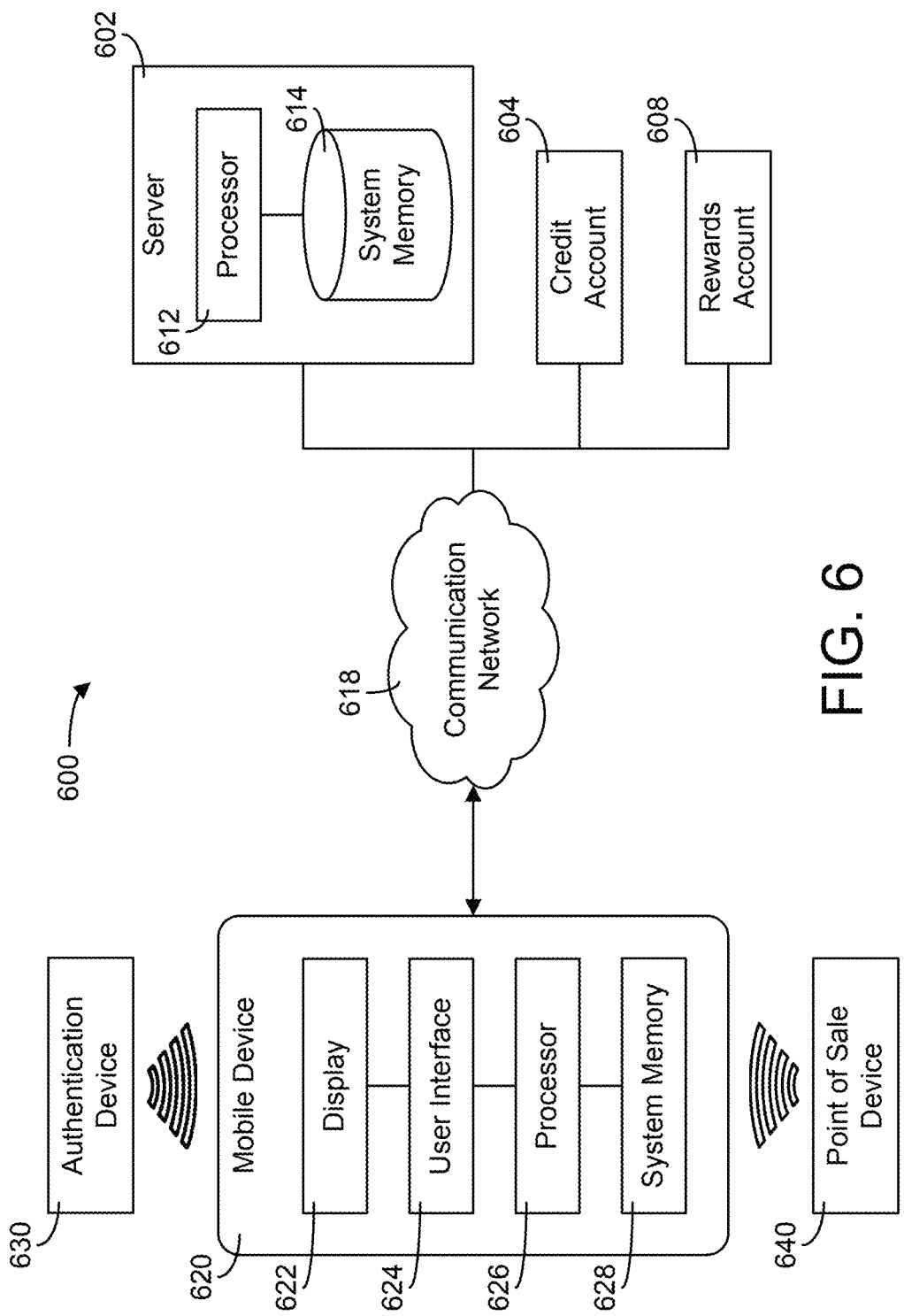
FIG. 6 is a block diagram illustrating a system for payment using rewards points according to an exemplary embodiment.

Referring now to FIG. 6, a block diagram illustrating a system 600 for payment using rewards points according to an exemplary embodiment is shown. System 600 may include, for example, a server 602. Server 602 may be implemented by, for example, general purpose or special purpose computers or other machines with a processor and memory configured to store applications including program code in the form of machine-executable instructions or data structures. In particular, server 602 may include one or more applications configured to implement the various embodiments of account management systems shown and described above with reference to FIGS. 1-5.

In some embodiments, server 602 may be implemented as a single unit for facilitating payment using rewards points. In other embodiments, system 600 may distribute functionality across multiple servers. For example, system 600 may additionally utilize a credit account server 604 and a rewards account server 606 for managing credit accounts and rewards accounts as shown and described above with reference to FIGS. 1-5.

Server 602 may include a processor 612. Processor 612 may be implemented in hardware, firmware, software, or any combination of these methods. Server 602 may have one or more processors 612 that use the same or a different processing technology. Additionally, processor 612 may be a separate component or may be embedded within another component of server 602. Processor 612 may execute applications including program code in the form of machine-executable instructions that may be written using one or more programming languages, scripting languages, assembly languages, etc. The instructions may be carried out by, for example, a special purpose computer, logic circuits, or hardware circuits. Processor 612 may execute, for example, one or more applications configured to implement the various embodiments shown and described above with reference to FIGS. 1-5.

Server 602 may further include a system memory 614. System memory 614 may include, for example, a non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired applications including program code in the form of machine-executable instructions or data structures and which may be accessed by a general purpose or special purpose computer or other machine. Server 602 may have one or more system memories 614 that use the same or a different memory technology.

System memory 614 may store one or more applications configured to implement the various embodiments shown and described above with reference to FIGS. 1-5. For example, system memory 614 may store an application configured to generate a graphical user interface when executed by processor 612, such as one or more dynamically generated web pages presented to customers via browser or mobile applications operating on mobile devices. The graphical user interface may prompt the customers to take certain actions and may receive user inputs provided in response to such prompting.

Server 602 may be accessed via, for example, a communication network 618. Communication network 618 may allow other devices to link to server 602 by, for example, a wired, wireless or combination local area network, wide area network (Internet), etc. Communication network 618 may include any necessary hardware and/or software to facilitate secure transmission of data.

Server 602 may also be accessed by a customer using a mobile device 620. Mobile device 620 may be, for example, a cellular phone, smart phone, personal digital assistant (PDA), tablet device, laptop computer, or other device. Mobile device 620 may include a display 622, a user interface 624, a processor 626, a system memory 628, and a system bus that couples various system components including system memory 626 to processor 624. In particular, mobile device 620 may be configured to implement the various embodiments of mobile devices shown and described above with reference to FIGS. 1-5.

Display 622 may be, for example, an LED or LCD display which may also include a touch screen. User interface 624 may include, for example, a keyboard, a keypad, a mouse, joystick or other input device performing a similar function. Processor 626 may be implemented in hardware, firmware, software, or any combination of these methods. Mobile device 620 may have one or more processors 626 that use the same or a different processing technology. Additionally, processor 626 may be a separate component of mobile device 620, or may be embedded within another component of mobile device 620. Processor 626 may execute applications including program code in the form of machine-executable instructions that may be written using one or more programming languages, scripting languages, assembly languages, etc. The instructions may be carried out by, for example, a special purpose computer, logic circuits, or hardware circuits. Processor 626 may execute, for example, email, browser or mobile applications stored in memory 628. The email, browser or mobile applications stored in memory 628 may be any type of software that is capable of communicating with server 602 via a network connection. System memory 628 may be, for example, RAM, ROM, EPROM, EEPROM, CD-ROM or any other medium which may be used to carry or store desired applications including program code in the form of machine-executable instructions or data structures. System memory 628 may also store other data such as, for example, authentication data as shown or described with reference to FIGS. 1-5.

Mobile device 620 may communicate with server 602 via communication network 618 through, for example, a wired, wireless or combination local area network, wide area network (Internet), etc. Programs may run on respective computers to create a client-server relationship. For example, in some embodiments, mobile device 620 may execute a web browser or mobile application to interact with server 602, and data may be provided to a user interface of the web browser or mobile application executing on mobile device 620. For example, server 602 may provide content to the web browser or mobile application of mobile device 620 in response to a request received from the mobile device.

Mobile device 620 may also communicate with an authentication device 630 and a point of sale device 640 through, for example, a wireless communication link using secure NFC standards and protocols such as ECMA-340 and ISO/IEC 14443 and 18092. In some embodiments, mobile device 620 may execute a browser or mobile application to interact with authentication device 630 and/or point of sale device 640, and data may be provided to a user interface of the browser or mobile application executing on mobile device 620. In some embodiments, mobile device 620 may receive biometric information using a known mobile biometric application.

Authentication device 630 may be, for example, a contactless EMV smart card capable of being configured to implement the various embodiments of authenication devices shown and described above with reference to FIGS. 1-5. Point of sale device 640 may be, for example, a magnetic stripe card reader, an RFID device, barcode reader, cash register, computing device, smart card reader, scanning device or other device employed for processing merchant transactions. In particular, mobile device 640 may be configured to implement the various embodiments of point of sale devices shown and described above with reference to FIGS. 1-5. In some embodiments, point of sale device 640 may be configured for communication using secure NFC standards and protocols. In some embodiments, point of sale device 640 may be further configured to communicate with server 602 either directly via communication network 618, or via a credit transaction facilitator such as VISA, MASTER CARD, DISCOVER, OR AMERICAN EXPRESS in order to, for example, reconcile credit transactions as shown and described above with reference to FIGS. 1-5.

The scope of this disclosure should be determined by the claims, their legal equivalents and the fact that it fully encompasses other embodiments which may become apparent to those skilled in the art. All structural, electrical and functional equivalents to the elements of the below-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

The embodiments in the present disclosure have been described with reference to drawings. The drawings illustrate certain details of specific embodiments that implement the systems, methods and programs of the present disclosure. However, describing the embodiments with drawings should not be construed as imposing any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system.

As noted above, embodiments within the scope of the present invention include program products comprising non-transitory machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments in the present disclosure have been described in the general context of method steps which may be implemented in one embodiment by a program product including machine-executable instructions, such as program code, for example, in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments in the present disclosure may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments in the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include one or more computers including a processor, a system memory or database, and a system bus that couples various system components including the system memory to the processor. The database or system memory may include read only memory (ROM) and random access memory (RAM). The database may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. User interfaces, as described herein, may include a computer with a monitor, a keyboard, a keypad, a mouse, a joystick or other input devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure. Such variations will depend on the software and hardware systems chosen and on designer choice. It is understood that all such variations are within the scope of the disclosure. Likewise, software and web implementations of the present invention could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

Throughout the specification, numerous advantages of the exemplary embodiments have been identified. It will be understood, of course, that it is possible to employ the teachings herein without necessarily achieving the same advantages. Additionally, although many features have been described in the context of a particular data processor, it will be appreciated that such features could also be implemented in the context of other hardware configurations.

While the exemplary embodiments illustrated in the figures and described above are presently preferred, it should be understood that these embodiments are offered by way of example only. Other embodiments may include, for example, structures with different data mapping or different data. The disclosed subject matter is not limited to a particular embodiment, but extends to various modifications, combinations, and permutations that nevertheless fall within the scope and spirit of the appended claims.

What is claimed:

1. A mobile device comprising:
a display device configured to present information to a user; and
a processing circuit comprising a processor and memory, the memory structured to store instructions that are executable by the processor and cause the processing circuit to:
receive a payment amount for a transaction from a merchant point-of-sale device of a merchant;
in response to receiving the payment amount from the merchant point-of-sale device, prompt, by a mobile application, the user to tap a contactless card to the mobile device;
detect the contactless card via a near-field communication between the contactless card and the mobile device, the contactless card having an online access credential stored thereon, the online access credential providing online access to a credit account and a rewards account maintained by a card issuing entity that issued the contactless card;
in response to detecting the contactless card:
automatically launch the mobile application;
retrieve, by the mobile application, the online access credential from the contactless card via the near-field communication;
automatically populate, by the mobile application, a graphical user interface with the payment amount received from the merchant point-of-sale device and at least a portion of the online access credential retrieved from the contactless card, the graphical user interface including a biometric data entry field configured to receive biometric data from the user; and
display, by the mobile application, the graphical user interface to the user;
receive, by the mobile application, the biometric data from the user via the biometric data entry field of the graphical user interface;
in response to an interaction with the graphical user interface by the user, send the online access credential, the biometric data, and the payment amount from the mobile device to an account management system associated with the contactless card;
receive selectable payment options for the payment amount from the account management system, the selectable payment options including a first option to fund a first portion of the payment amount by the credit account and a second portion of the payment amount by the rewards account and a second option to fund an entire amount of the payment amount using one of the credit account or the rewards account based on a determination by the account management system that one of an amount of credit available in the credit account is sufficient to fund the entire amount of the payment amount or an amount of rewards points available in the rewards account is sufficient to fund the entire amount of the payment amount;
send a customer selection of the first option to the account management system;
receive a single authorized form of payment for the payment amount from the account management system based on the customer selection of the first option, the single authorized form of payment being at least one of a quick response (QR) code, a bar code, or a near-field communication (NFC) transmission and comprising an indication regarding the first portion of the payment amount that is funded by the credit account based on the user being authenticated using the online access credential and the biometric data and an indication regarding the second portion of the payment amount funded by the rewards account based on the user being authenticated using the online access credential and the biometric data; and
provide the single authorized form of payment including the first portion funded by the credit account and the second portion funded by the rewards account maintained by the card issuing entity to the merchant point-of-sale device of the merchant, wherein providing the single authorized form of payment to the merchant point-of-sale device comprises one of displaying the QR code or the bar code via the display device for scanning by the merchant point-of-sale device or transmitting the NFC transmission to the merchant point-of-sale device.

2. The mobile device of claim 1, wherein the memory includes the mobile application, and the mobile application is configured to receive and transmit the payment amount.

3. The mobile device of claim 1, further comprising a near-field communication device that is configured to exchange information with the merchant point-of-sale device.

4. The mobile device of claim 3, wherein the single authorized form of payment is provided to the merchant point-of-sale device via the near-field communication device.

5. The mobile device of claim 1, wherein the display device is further configured to receive an input from the user and the payment amount is received via the display device.

6. The mobile device of claim 1, wherein the single authorized form of payment is at least one of the bar code or the QR code, and wherein providing the single authorized form of payment to the merchant point-of-sale device comprises displaying the QR code or the bar code via the display device to the merchant point-of-sale device.

7. A mobile device comprising:
a display device configured to present information to a user; and
a processing circuit comprising a processor and memory, the memory structured to store instructions that are executable by the processor and cause the processing circuit to:
receive a payment amount for a transaction from a merchant point-of-sale device of a merchant;
in response to receiving the payment amount from the merchant point-of-sale device, prompt, by a mobile application, the user to tap a contactless card to the mobile device;
detect the contactless card via a tap of the contactless card to the mobile device, the contactless card having an online access credential stored thereon and being configured to generate a cryptographically generated code, the online access credential providing online access to a credit account and a rewards account maintained by a card issuing entity that issued the contactless card;
in response to detecting the contactless card:
automatically launch the mobile application;
retrieve, by the mobile application, authentication data from the contactless card via the tap of the contactless card to the mobile device, the authentication data including the online access credential and the cryptographically generated code;
automatically populate, by the mobile application, a graphical user interface with the payment amount received from the merchant point-of-sale device and at least a portion of the online access credential retrieved from the contactless card, the graphical user interface including a biometric data entry field configured to receive biometric data from the user; and
display, by the mobile application, the graphical user interface to the user;
receive, by the mobile application, the biometric data from the user via the biometric data entry field of the graphical user interface;
in response to an interaction with the graphical user interface by the user, send the authentication data, the biometric data, and the payment amount from the mobile device to an account management system associated with the contactless card;
receive selectable payment options for the payment amount from the account management system, the selectable payment options including a first option to fund a first portion of the payment amount by the credit account and a second portion of the payment amount by the rewards account and a second option to fund an entire amount of the payment amount using one of the credit account or the rewards account based on a determination by the account management system that one of an amount of credit available in the credit account is sufficient to fund the entire amount of the payment amount or an amount of rewards points available in the rewards account is sufficient to fund the entire amount of the payment amount;
send a customer selection of the first option to the account management system;
receive a single authorized form of payment for the payment amount from the account management system based on the customer selection of the first option, the single authorized form of payment being at least one of a quick response (QR) code, a bar code, or a near-field communication (NFC) transmission and comprising an indication regarding the first portion of the payment amount that is funded by the credit account based on the user being authenticated using at least the online access credential and the biometric data and an indication regarding the second portion of the payment amount funded by the rewards account based on the user being authenticated using at least the online access credential and the biometric data; and
provide the single authorized form of payment including the first portion funded by the credit account and the second portion funded by the rewards account maintained by the card issuing entity to the merchant point-of-sale device of the merchant, wherein providing the single authorized form of payment to the merchant point-of-sale device comprises one of displaying the QR code or the bar code via the display device for scanning by the merchant point-of-sale device or transmitting the NFC transmission to the merchant point-of-sale device.

8. The mobile device of claim 7, wherein the memory includes the mobile application, and the mobile application is configured to receive and transmit the payment amount.

9. The mobile device of claim 7, further comprising a near-field communication device that is configured to exchange information with the merchant point-of-sale device.

10. The mobile device of claim 9, wherein the single authorized form of payment is provided to the merchant point-of-sale device via the near-field communication device.

11. The mobile device of claim 7, wherein the single authorized form of payment is one of the QR code or the bar code.

12. The mobile device of claim 11, wherein providing the single authorized form of payment to the merchant point-of-sale device comprises displaying the QR code or the bar code via the display device to the merchant point-of-sale device.

13. A method, comprising:
receiving, by a mobile device of a user, a payment amount for a transaction from a merchant point-of-sale device of a merchant;
in response to receiving the payment amount from the merchant point-of-sale device, prompting, by a mobile application of the mobile device, the user to tap a contactless card to the mobile device;
detecting, by the mobile device, the contactless card via a short-range short range communication from the contactless card to the mobile device, the contactless card having an online access credential stored thereon, the online access credential providing online access to a credit account and a rewards account maintained by a card issuing entity that issued the contactless card;

in response to detecting the contactless card:
  automatically launch, by the mobile device, the mobile application;
  retrieving, by the mobile application of the mobile device, the online access credential via the short-range short range communication from the contactless card to the mobile device;
  automatically populating, by the mobile application of the mobile device, a graphical user interface with the payment amount received from the merchant point-of-sale device and at least a portion of the online access credential retrieved from the contactless card, the graphical user interface including a biometric data entry field configured to receive biometric data from the user; and
  displaying, by the mobile application of the mobile device, the graphical user interface to the user;
receiving, by the mobile application, the biometric data from the user via the biometric data entry field of the graphical user interface;
in response to an interaction with the graphical user interface by the user, sending, by the mobile device, the online access credential, the biometric data, and the payment amount from the mobile device to an account management system associated with the contactless card;
receiving, by the mobile device, selectable payment options for the payment amount from the account management system, the selectable payment options including a first option to fund a first portion of the payment amount by the credit account and a second portion of the payment amount by the rewards account and a second option to fund an entire amount of the payment amount using one of the credit account or the rewards account based on a determination by the account management system that one of an amount of credit available in the credit account is sufficient to fund the entire amount of the payment amount or an amount of rewards points available in the rewards account is sufficient to fund the entire amount of the payment amount;
sending, by the mobile device, a customer selection of the first option to the account management system;
receiving, by the mobile device, a single authorized form of payment for the payment amount from the account management system based on the customer selection of the first option, the single authorized form of payment being at least one of a quick response (QR) code, a bar code, or a near-field communication (NFC) transmission and comprising an indication regarding the first portion of the payment amount that is funded by the credit account based on the user being authenticated using the online access credential and the biometric data and an indication regarding the second portion of the payment amount funded by the rewards account based on the user being authenticated using the online access credential and the biometric data; and
providing, by the mobile device, the single authorized form of payment including the first portion funded by the credit account and the second portion funded by the rewards account maintained by the card issuing entity to a merchant point-of-sale device of the merchant, wherein providing the single authorized form of payment to the merchant point-of-sale device comprises one of displaying the QR code or the bar code via a display device of the mobile device for scanning by the merchant point-of-sale device or transmitting the NFC transmission to the merchant point-of-sale device.

14. The method of claim 13, wherein the single authorized form of payment is provided to the merchant point-of-sale device via a near field communication device of the mobile device.

15. The method of claim 13, wherein the single authorized form of payment is one of the QR code or the bar code.

16. The method of claim 15, wherein providing the single authorized form of payment to the merchant point-of-sale device comprises displaying, by the mobile device, the QR code or the bar code via the display device to the merchant point-of-sale device.

\* \* \* \* \*